United States Patent [19]

Yagi et al.

[11] Patent Number: 4,962,672

[45] Date of Patent: Oct. 16, 1990

[54] TORQUE SENSOR

[75] Inventors: Toru Yagi; Hideo Matsuki, both of Saitama, Japan

[73] Assignee: Honda Giken Kigyo Kabushiki Kaisha, Tokyo, Japan

[21] Appl. No.: 426,321

[22] Filed: Oct. 23, 1989

Related U.S. Application Data

[62] Division of Ser. No. 160,682, Feb. 26, 1988, Pat. No. 4,899,597.

[30] Foreign Application Priority Data

Feb. 27, 1987 [JP] Japan ................. 62-045814
Feb. 27, 1987 [JP] Japan ................. 62-045815
Feb. 27, 1987 [JP] Japan ................. 62-045816
Feb. 27, 1987 [JP] Japan ................. 62-045817

[51] Int. Cl.$^5$ ................................. G01L 3/10
[52] U.S. Cl. ................................. 73/862.36
[58] Field of Search .......... 73/862.33, 862.36, DIG. 2

[56] References Cited

U.S. PATENT DOCUMENTS 4,817,444  4/1989  Yagi et al. ................. 73/862.36

FOREIGN PATENT DOCUMENTS 0655868  1/1963  Canada ................. 73/862.36
0046527  3/1984  Japan ................. 73/862.36
0800727  1/1981  U.S.S.R. ................. 73/862.36

Primary Examiner—Charles A. Ruehl
Attorney, Agent, or Firm—Lyon & Lyon

[57] ABSTRACT

A torque sensor comprising a magnetic amorphous film whose magnetostrictive characteristics vary with the amount of torque applied thereto and coils for detecting magnetostrictive variation disposed opposite the magnetic member. The torque sensor is constituted as an independent unit separate from the shaft whose torque is to be measured. The independent unit comprises a tubular or a shaft member having the magnetic amorphous film attached thereto and a housing with the coils at its inner wall. The housing covers the tubular or shaft member and is rotatable about the same axis as the member. The tubular member is easily mounted on the shaft through spline fittings in one embodiment and the short shaft member of the other embodiment is easily mounted between the two shaft ends via spline fittings and flange couplings.

9 Claims, 9 Drawing Sheets

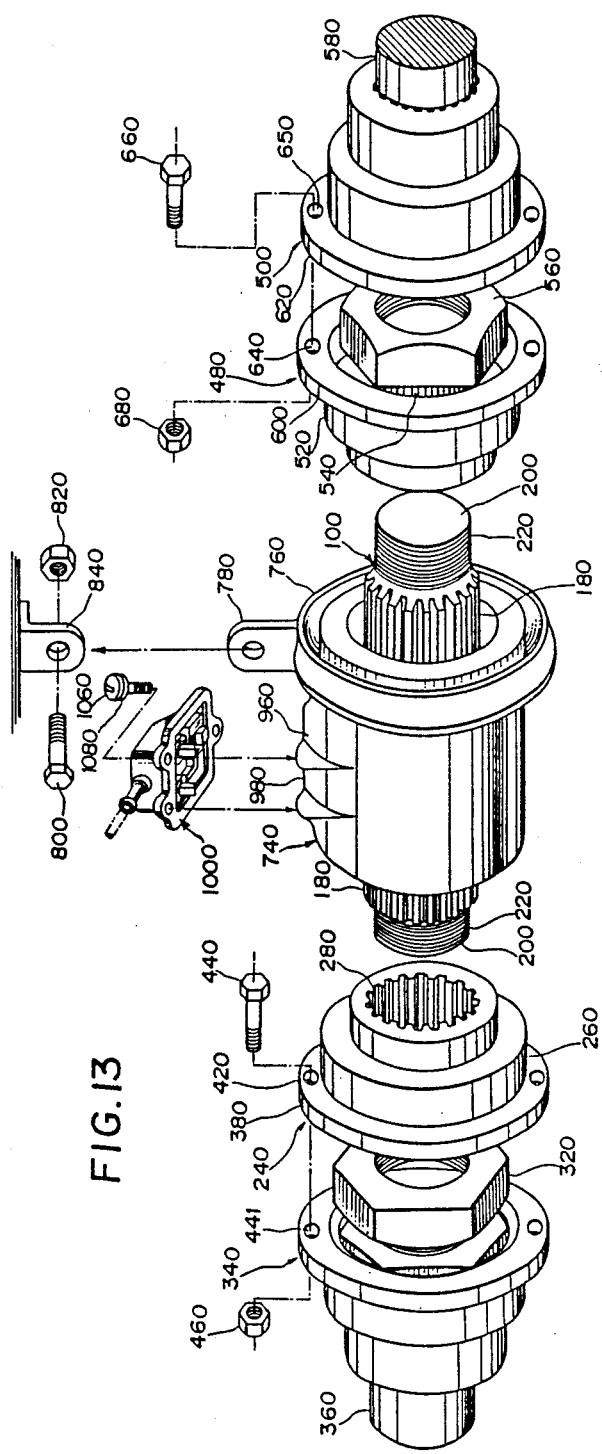

TORQUE SENSOR

This is a divisional of co-pending application Ser. No. 160,682 filed on Feb. 26, 1988, now U.S. Pat. No. 4,899,597.

BACKGROUND OF THE INVENTION

1. Field of the Invention

This invention relates to a torque sensor for detecting the torque of a rotating shaft, more particularly to a torque sensor suitable for measuring the torque of a drive shaft, steering shaft or other rotating shaft of an automobile and the like.

2. Description of the Prior Art

One torque sensor which measures the torque of a shaft by sensing the amount of twist therein is unable to measure static torque. Because of this inadequacy, there have recently been introduced a number of torque sensors operating on the principle of magnetostriction. One example of such a torque sensor is described in Japanese laid-open Patent Publication No. 57(1982)-211030, wherein a ribbon-like magnetostrictive strip is wound on a shaft whose torque is to be measured.

The structure of the torque sensor disclosed by this publication requires that the magnetostrictive member be fixed directly on the shaft whose torque is to be measured so that the shaft itself becomes one component of the torque sensor. This is disadvantageous for several reasons. First, during manufacture of the torque sensor, it is generally necessary to attach the magnetostrictive member to a shaft of considerable length such as an automobile drive shaft, and this is difficult to do with high positional precision. Then, after the magnetostrictive member has been fixed on the shaft and up to the time that the shaft is installed in the vehicle, which is generally late in the assembly process, it is necessary to take great care in transporting and storing the shaft bearing the magnetostrictive member so as to protect the member from damage and adherence of dust or the like. The need to take these precautions greatly complicates the overall process of shaft installation.

Moreover, since the shaft whose torque is to be measured is involved as one component of the sensor, the sensor cannot be completed without mounting the other components on the shaft. As a result, it is not possible to adjust the gap between the magnetostrictive member and the associated coils until the assembly is carried out. Another disadvantage arises from the fact that drive shafts and other such automotive parts are only required to have adequate strength and are not required to have high dimensional precision. It therefore becomes necessary to use a special, separate adjustment means for adjusting the gap, which leads to further inconveniences as regards inventory control, performance control, maintenance and the like.

Also, since the structure is such that the coil and other components which are relatively susceptible to damage by mechanical shock are not capable of being easily removed from the exterior, special care has to be used during assembly and installation. This structure would degrade sensing accuracy and is also disadvantageous from the standpoint of maintenance.

SUMMARY OF THE INVENTION

In view of the aforesaid shortcomings of the conventional torque sensors, it is an object of the present invention to provide a torque sensor which is constituted as an independent unit separate from the shaft whose torque is to be measured and in which the shaft is not involved as a component of the torque sensor, while the unit can be easily mounted on the shaft.

Another object of the invention is to provide a torque sensor wherein a magnetic element such as a magnetostrictive amorphous film is affixed on a member covered by a housing or an enclosure member so as to protect the film from damage during transportation, inventory and assembling while no special adjusting means is required for keeping the gap or distance between the film and detecting means to a predetermined value and which is enhanced in sensing accuracy.

For realizing the objects, the present invention provides a torque sensor comprising a shaft whose torque is to be measured. Said shaft is externally splined. And it further comprises a tubular member mountable on the shaft, said tubular member being internally splined at its inner wall to fit to the external splines of the shaft when mounted thereon so as to receive transmission of the shaft rotation, a magnetic element provided at the outer wall of the tubular member responsive to the rotation thereof, an enclosure member housing said tubular member independently of its rotation and means for detecting change of magnetic characteristics of the element positioned at the inner wall of the enclosure member to measure the torque applied to the shaft.

The above and other features of the present invention will become apparent from the following description made with reference to the drawings.

BRIEF DESCRIPTION OF THE DRAWINGS

FIG. 13 is an explanatory perspective view showing how to mount the torque sensor on a shaft whose torque is to be measured;

DESCRIPTION OF THE PREFERRED EMBODIMENTS

Figure 1:
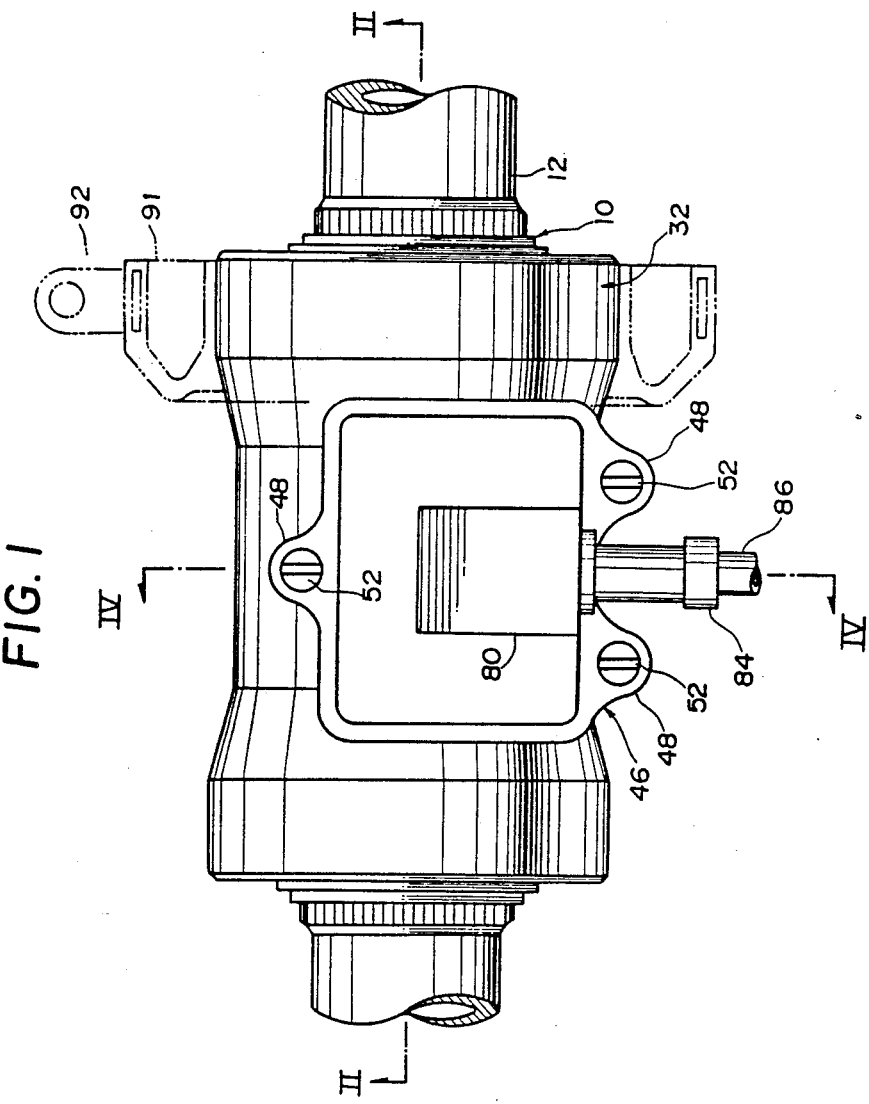
FIG. 1 is a plan view of the torque sensor mounted on a shaft whose torque is to be measured according to the first embodiment of the present invention.
Figure 2:
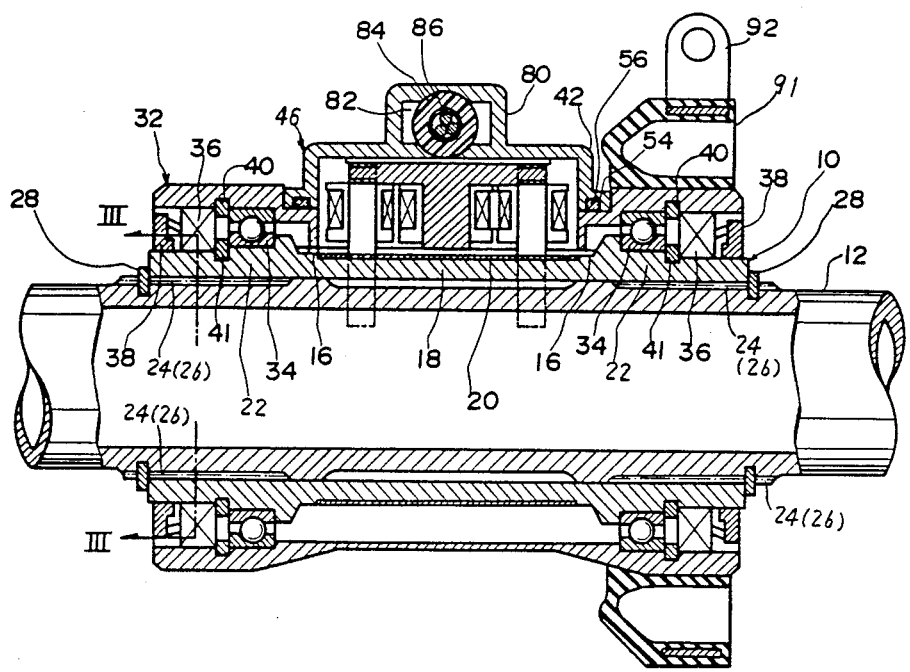
FIG. 2 is a sectional view of the same taken along line II—II in FIG. 1.
Figure 3:
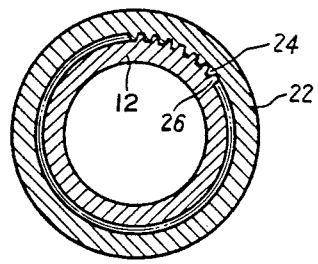
FIG. 3 is a sectional view of the same taken along line III—III in FIG. 2.

To begin with, a torque sensor according to a first embodiment of the invention will be described with reference to the accompanying drawings. In the drawings, numeral 10 designates a tubular member. In the illustrated embodiment, the tubular member 10 is substantially a true cylinder of circular cross-section and has a bore 14, best shown in FIG. 8, of a diameter slightly larger than the diameter of a shaft 12 whose torque is to be measured. The bore 14 runs the full length of the tubular member 10. At either side of the central portion of the tubular member 10, steps 16 are formed as annular protuberances such that a cylindrical portion 18 is constituted therebetween. The cylindrical portion 18 is of constant diameter throughout its full length and on the portion a magnetic element such as an magnetic amorphous film 20 is fixed in an appropriate manner such as plating. The steps 16 can serve as a guide for placing the film on the portion in position. The steps 16 are followed by shoulder portions and an area left between the shoulder portions and the end. The area becomes relatively so large in diameter as to form boss portions 22,22. At immediately below the boss portions, the bore wall is grooved to form a number of key ways to form internal splines 24,24. On the other hand, the shaft 12 may be provided with numerous keys to form an external splines 26,26 at two portions, partially spaced apart from each other along the shaft length, corresponding to the position where the internal splines 24,24 are grooved when the tubular member is mounted on the shaft such that the internal and external splines mesh together to permit the transmission of rotation. Underneath the portion 18 where the magnetic amorphous film 20 is affixed, an area is left out of the splines 24,24 such that the tubular member 10 is able to twist to produce stress in the film. It may be possible, however, to form either one of the splines externally at the shaft or boss portion throughout the length including the area provided, such that no mated pair to be meshed exists there. Further it should be noted that, when machining, tolerance may be allowed to be held to the absolute minimum such that the shaft be press fitted in the boss portion without causing any mechanical deformation. Thus,the shaft 12 will be securely engaged with the tubular member 10 without causing any slippage therebetween so that torque if applied to the shaft will be fully transmitted to the tubular member. A pair of rings 28,28 having open ends are provided on the shaft 12 near the ends of the tubular member 10 in order to prevent lateral movement of the member 10 along the shaft 12.

On the outer wall of the tubular member 10 are embeddedly fitted a pair of bearings 34, 34. The bearings 34,34 are provided at the outer surface of the boss portions 22,22 and outward of the bearings 34 to form a housing or an enclosure member 32 which serves as an outer covering for the unit. As the housing 32 is coupled with the tubular member 10 via the bearings 34, it can rotate independently of the tubular member 10 and further of the shaft 12 so that when the member rotates together with the shaft, the housing 32 can be maintained stationary, i.e., can be prevented from rotating together therewith. The reference numerals 36, 36 indicate oil seals and the reference numerals 38, 38 packings. And the reference numerals 40, 40 and 41, 41 designate respectively rings embeddedly fitted in the tubular member and housing for preventing lateral movement of the housing through the bearings.

Figure 8:
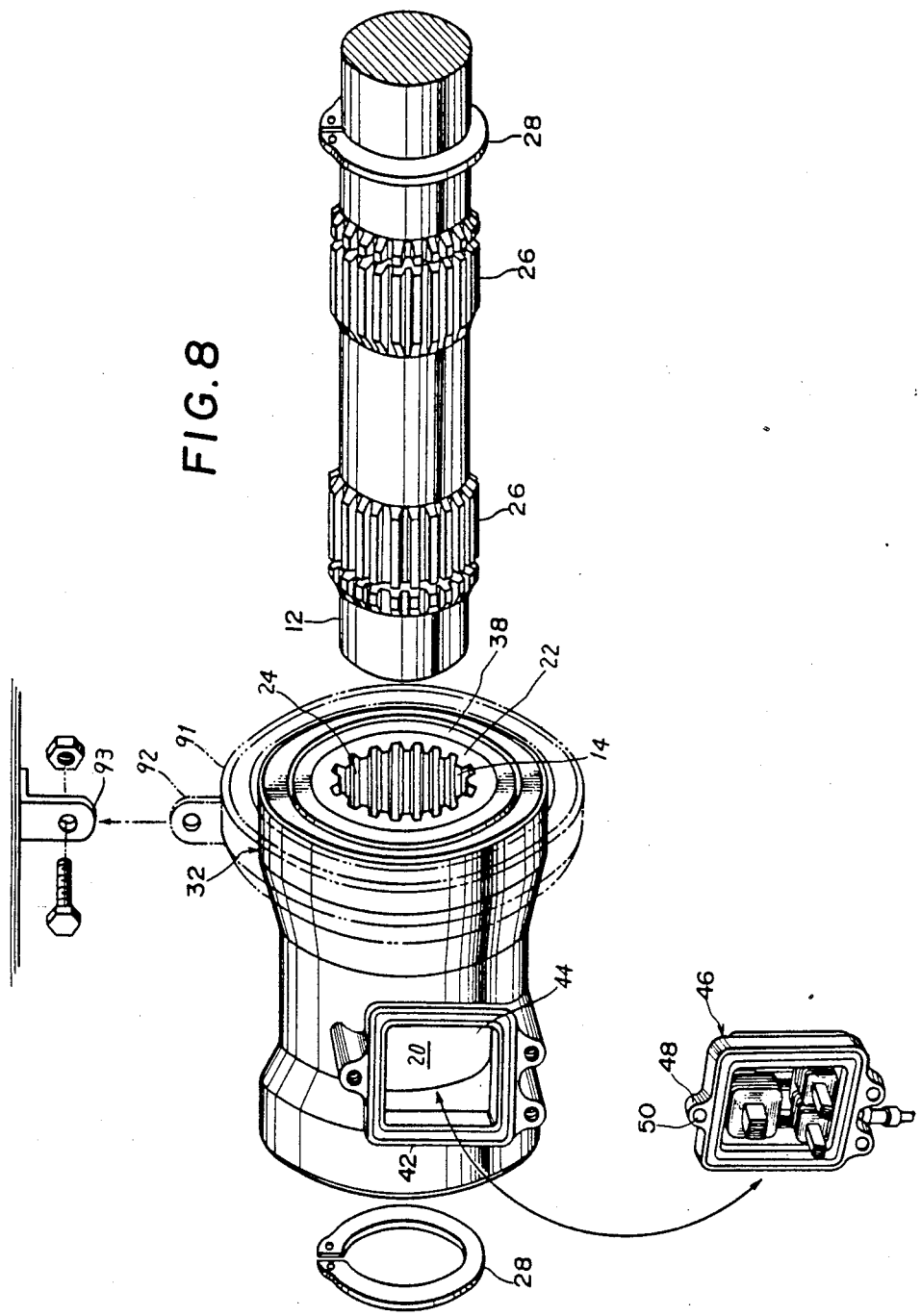
FIG. 8 is an explanatory perspective view showing how to mount the torque sensor on the shaft to be measured.

As best shown in FIG. 1, the housing 32 has a cylindrical configuration wherein its central portion is constricted and is lessened in diameter to decrease its weight. And as shown in FIG. 8, the housing wall rises locally at the constricted central portion to form a bulged portion 42. The bulged portion 42 is cut away at its top surface to provide an opening 44 which is closable by a cover 46. The cover 46 is square-shaped as clearly shown in FIG. 1 and can be fastened to the opening by screws 52 screwed into threaded holes 50 provided in the housing through holes formed at ear-like portions 48 of the cover. As best shown in FIG. 6, a groove 54 is formed on the inner wall of the cover along its periphery. An O-ring 56 is provided in the groove for tight sealing (The ring is omitted in FIGS. 5 and 6).

Figure 4:
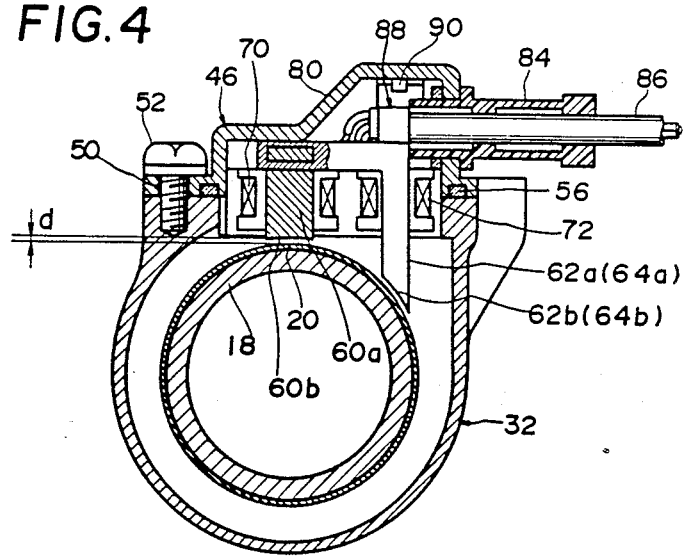
FIG. 4 is a sectional view of the same taken along line IV—IV, in FIG. 1.

On the inner surface of the cover 46, three cores made of silicon steel plates are fastened there by stays 66 in combination with screws 68. The cores are so oriented that they are in a square-like configuration as shown in a plan view of FIG. 5. To be more specific, the cores are combined in such a manner that their laminated steel plates cross with each other at a right angle as depicted in FIG. 6. Each of the cores extends its portion vertically to form legs 60a,62a,64a acting as a pole to the extent that the end surfaces 60b,62b,64b of the legs are in close proximity to the amorphous film, when assembled. The legs 62a,64a are longer than the leg 60a to keep a predetermined and uniform gap or distance "d", as shown in FIG. 4. The end surface of the legs are rounded with the same radius of curvature as the outer surface of the tubular member on which the amorphous film is affixed in order to enhance sensing accuracy. The inner wall of the cover is made flat over the entire area including its periphery, so that it will be easy to set the height of the legs in order to maintain the gap "d" at a predetermined value, since the base is level for all the legs. The fact that the end surface of the legs is curved similarly as the film will be helpful to keep the gap constant. Further, the periphery of the cover 46 is also kept flat, so that the threaded holes 50 formed in the mated housing are also positioned at the coplanar level. Assembling is thus highly facilitated.

Figure 5:
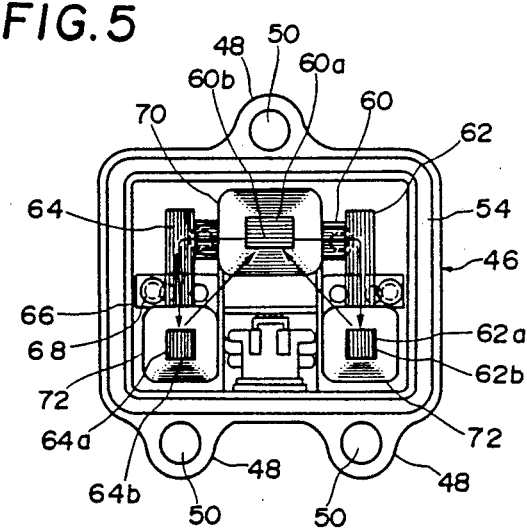
FIG. 5 is a plan view showing the inner surface of a cover attached to the sensor housing.
Figure 6:
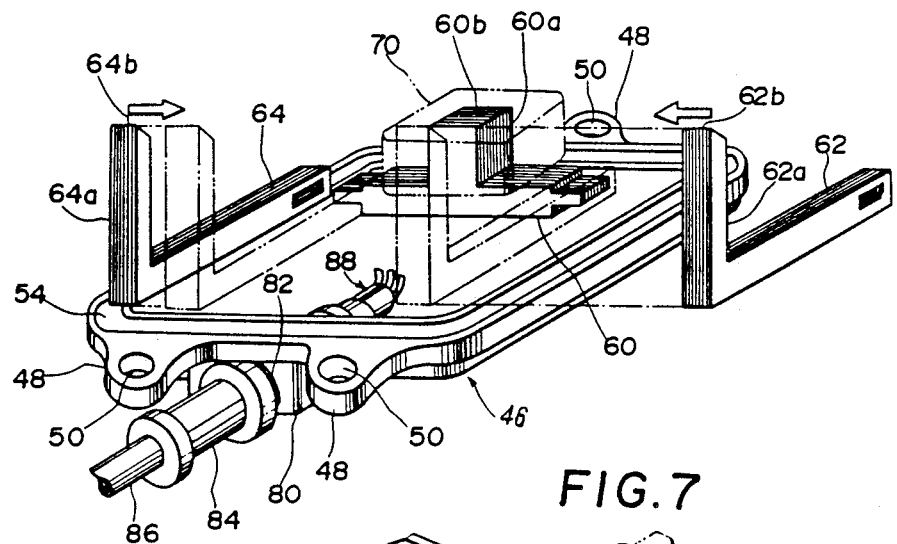
FIG. 6 is an explanatory perspective view of the cover inner surface.

A coil is wound on the central leg 60a to form an excitation coil 70 as viewed from FIG. 5 and two detection coils 72, 72 are similarly wound on the remaining two legs 62a,64a in opposite winding directions. The two legs 62a,64a are disposed downwardly and symmetrically with respect to the central leg. The excitation coil 70 and detection coils 72, 72 are thus arranged such that flux paths generated therebetween are at ±45 degree angles with respect to the longitudinal axis of the tubular member 10 and the shaft 12, in other words, the flux paths coincide with the directions in which the compressive and tensile stress, if occurring when torque is applied to the shaft, becomes maximum. It should be noted, moreover, that the magnetic amorphous film 20 must have been conferred, prior to be fixed on the tubular member 10, with uniaxial magnetic anisotropy oriented at the same angle degrees relative to the axis of the tubular member.

Aside from the above, there is a close relation between the excitation frequency of the alternating current and sensing accuracy in torque sensors of this nature. Namely, the higher the frequency rises, the more sensing accuracy advances. However, there is a disadvantage in that the higher the current frequency rises, the greater the eddy-current loss becomes, in the case where the core is made of a single iron core. However, since the core used in the invention is made of the laminated silicon steel plates which are joined together crossing at a right angle, the frequency can be advantageously raised, without causing the problem of eddy-current loss, to improve sensing accuracy.

Figure 7:
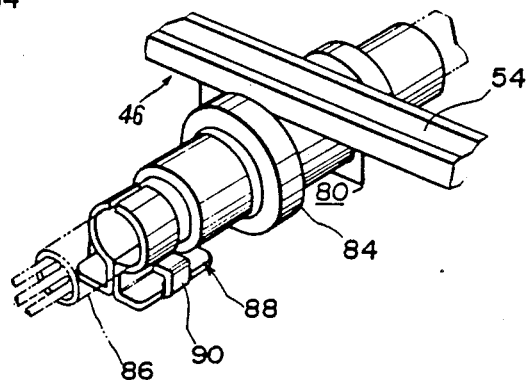
FIG. 7 is an explanatory perspective view of a harness clamper provided at the sensor housing.

The inner wall of the aforesaid cover 46 protrudes outwardly at an area surrounded by the coils so as to form a projection 80. The projection 80 is opened at its end to provide a window 82 where grommet 84 rests. A harness 86 tying wires together and extending from the exterior passes through the grommet 84 and then branches out the wires respectively in the projection 80 to be connected to the coils. As shown in FIG. 7, a clamper 88 is provided at a position before the wires branches out. The clamper 88 has an omega-shape configuration in cross section comprising a base and a pipe portion extending from the base. The pipe portion is split axially in order to grasp the harness 86 firmly. The clamper 88 is fixed on the wall of the projection 80 with the base coupled with nails extending from the projection wall. The harness 86 is thus gripped rigidly so that the wires will not be pulled out from the coils even when unexpected external tensile force happens on the harness. The grommet 84 is formed with two annular projections along the wall which are spaced apart each other to prevent the grommet itself from removing from the window 82. The window is filled up with plastics for sealing although it is not illustrated in the drawings.

Next, an explanation will be made how to attach the torque sensor to the shaft whose torque is to be measured and how to use the same thereafter.

As shown in FIG. 8, for fixing the sensor on the shaft of an automobile drive shaft or the like, the shaft 12 is inserted in the bore 14 of the tubular member 10 and is placed in position to mesh the external and internal splines 24,26 together. The cover 46 is left un-attached to the housing at this stage. Then the rings 28 are put on the shaft near the both ends of the member to block lateral movement of the member. The cover 46 is finally fastened to the housing and the sensor is now completed. The sensor, thus completed, is then fixed to the automobile. Namely, the sensor housing 32 is fastened, with a screw and a nut, to a bracket 93 mounted on the automobile body through a stay 92 extending from an annular wing 91 provided along the housing wall. The wing 91 is made of an elastic material such as a rubber and will absorb mechanical shock caused by the automobile, which might otherwise be transmitted to the sensor.

Figure 9:
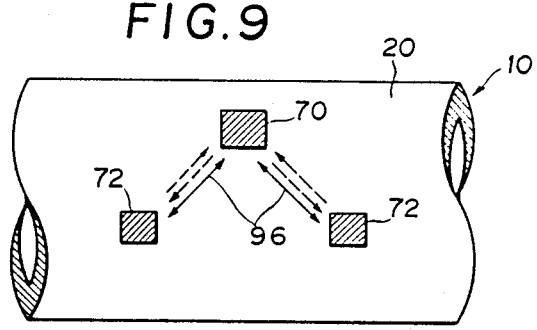
FIG. 9 is an explanatory view illustrating the detection operation of the torque sensor.
Figure 10:
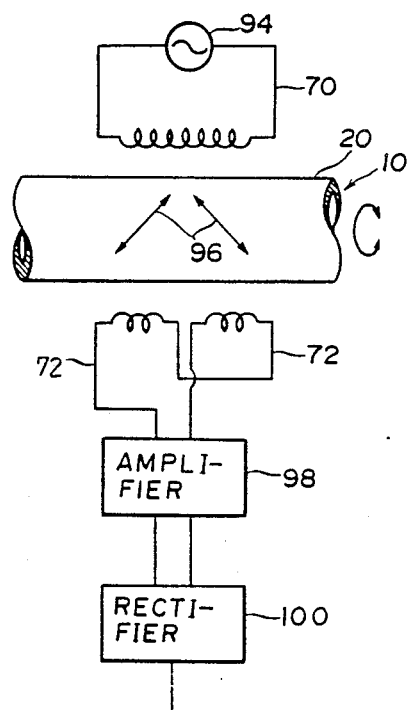
FIG. 10 is a block diagram realizing the detection operation.

When the attachment has been completed in this way, after exciting the coil 70 by supplying current from an AC power source 94 as illustrated in FIGS. 9 and 10, any amount of torque applied to the shaft 12 will be transferred to the tubular member 10 through the spline fitting as a torque of identical magnitude. Thus, as is well known, the compressive and tensile stress produced in the magnetic amorphous film 20 as a result of this torque will give rise to magnetostriction therein. Since, the aforesaid coils are arranged such that lines connecting the magnetic poles thereof form a right isosceles triangle, with the excitation coil 70 positioned at the uppermost right angle and the two detection coils 72 located at the respective lower 45-degree angles, and further the flux paths between the coils coincide with the directions of the anisotropy, the detection coils are able to detect the change in permeability resulting from magnetostriction caused by the aforesaid application of torque, and produce outputs corresponding to the electromotive force induced therein. Then when these outputs are differentially extracted, appropriately amplified by an amplifier 98 and rectified by a rectifier 100, it becomes possible to determine the rotational direction from the phase of the outputs and to determine the magnitude of the torque from the value of the outputs. As the detection outputs are extracted by use of differential connection, the shaft 12 will have no effect on the results of the measurement even if it is made from a ferromagnetic material.

Since the torque sensor according to this invention is realized as an independent unit which does not use the shaft whose torque is to be measured as one of its constituent elements, it need only to be attached to the shaft at some appropriate stage of the vehicle assembly operation. The cylindrical member to which the magnetic amorphous film is attached is considerably shorter than the drive shaft or the like and is therefore much easier to handle. Further, the fact that the magnetic amorphous film is covered and protected by the housing member results in an additional increase in operational efficiency since less care is necessary for protecting it from damage and the adherence of dust and the like during transport, storage and mounting. While the fact that the torque sensor is constructed as an independent unit might be expected to give rise to problems if its attachment to the shaft whose torque is to be detected should be such that slippage could occur between the two, since under such circumstances it would not be possible to carry out accurate detection, the torque sensor according to the present invention is entirely free from any such problem since it provides a highly reliable mounting based on the spline fitting.

Moreover, since the number of components requiring precise positioning with respect to one another has been kept to the minimum, it is not particularly difficult in the course of fabrication to assure that the positions of the bearings 34 and the dimensions of the housing 32, the cover 46 and the cores 60, 62, 64 etc. are maintained within the prescribed tolerances. This, plus the effect obtained as a result of the inner surface of the cover 46 on which the cores are fastened being flat, enables the gap "d" (FIG. 4) between the end surface of the coil legs and the magnetic amorphous film to be maintained at a constant magnitude, thus eliminating the need for any special adjustment means, making it possible to realize a compact, light and low cost torque sensor, and reducing dimensional variance and, consequently, detection output variance among different torque sensors manufactured in accordance with this invention. It also leads to improved maintenance or assembling efficiency from the point that the coils are fastened on the cover which is easily accessed from the outside.

Figure 11:
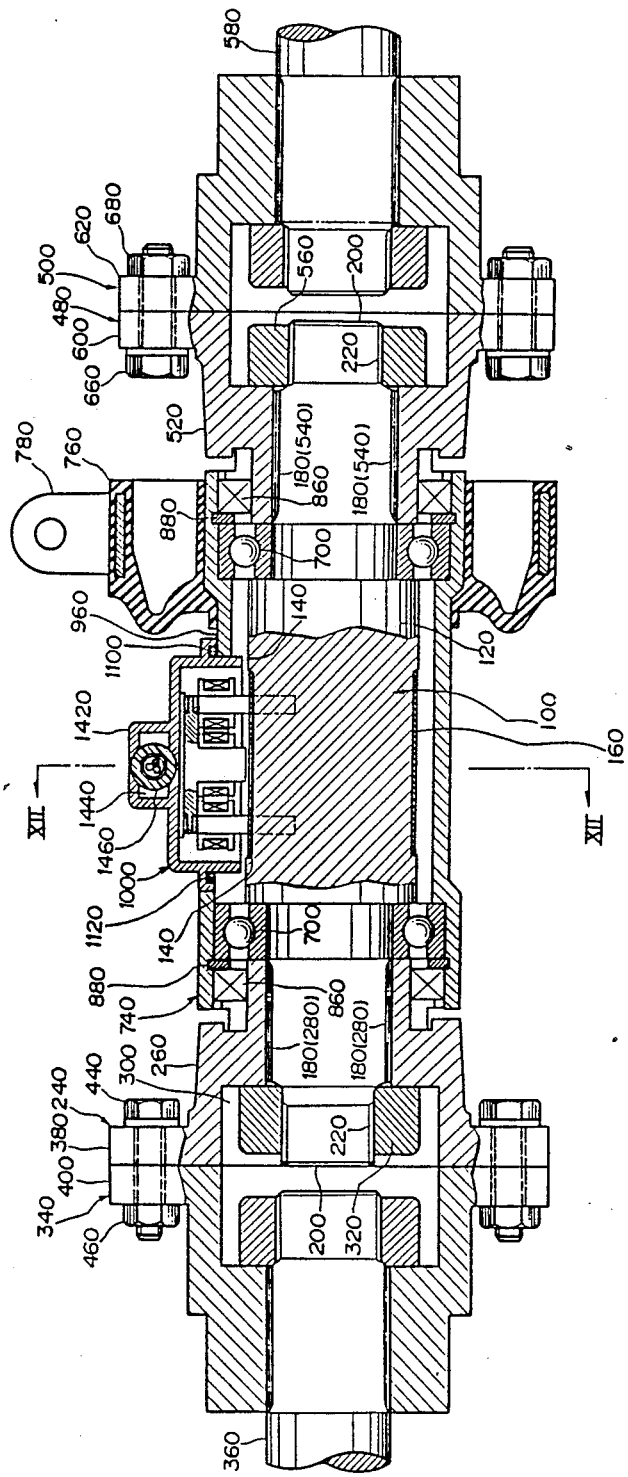
FIG. 11 is an axial sectional view of the torque sensor according to the second embodiment of the present invention.
Figure 12:
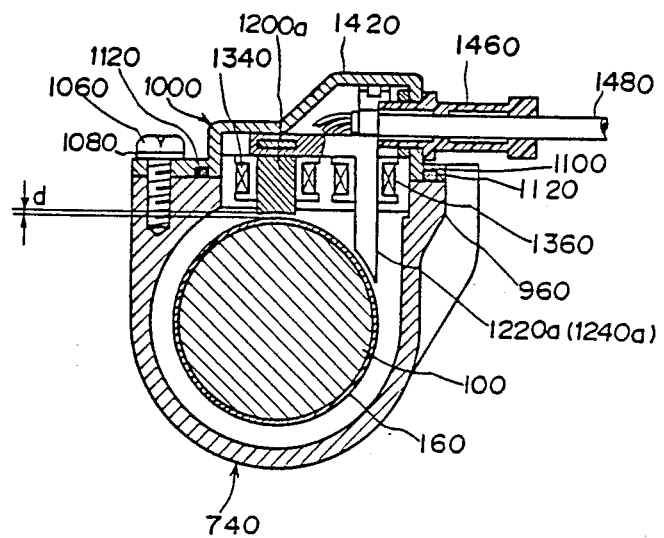
FIG. 12 is a sectional view of the same taken along line XII—XII in FIG. 11.

FIGS. 11, 12 and 13 shows a second embodiment of the torque sensor according to the invention. Briefly summing up how the sensor differs from that in the first embodiment before entering into a detailed explanation of the structure, the shaft whose torque is to be measured is now cut into two halves and the sensor is provided therebetween. The sensor is a similar shape as was discussed in the first embodiment except that there is used a solid short shaft member, instead of the tubular member, functioning similarly as the tubular member in the first embodiment. The shaft member bears the magnetic amorphous film on the surface and is coupled with the two shaft halves through flange couplings. The sensor according to the second embodiment is particularly directed to make it easier to mount the sensor on a long shaft such as a drive shaft of the vehicle.

Now, a mode of construction of the sensor will be explained hereinafter referring to FIGS. 11, 12 and 13 inclusive. In the Figures, the reference numeral 100 indicates the aforesaid solid short shaft member. The shaft member 100 is circular in cross section and has a similar stiffness as the shaft whose torque is to be measured. The shaft member 100 is made large in diameter at the midway of the length to form a central portion 120, circular in cross section, at a point where the magnetic amorphous film 160 is affixed in position guided by steps 140,140. The shaft member 100 is provided with splines 180,180 in the vicinity of the respective ends 200,200. The ends have a threaded portions 220,220 respectively.

Reference numeral 240 designates one half of the flange couplings associated with the other coupling half 340, positioned at the left of the shaft member in FIG. 11. The coupling half 240 has a boss 260 and at the inner surface thereof internal splines 280 are formed to fit to the external splines 180 of the shaft member. Tolerance allowed therebetween is limited as little as possible similarly as those mentioned in the first embodiment. A recess 300 is formed in the boss 260 where the shaft member sticks out of the threaded end 200. In the recess, the threaded end is screwed by a nut 320 and is fixed there. The other half 340 of the couplings receives likewise one half 360 of a shaft whose torque is to be measured. The two coupling halves are connected to each other by bolts 440 penetrating through holes 420, 441 formed at their flange portions 380,400 and nuts 460.

Further, there are provided another set of flange couplings comprising a coupling half 480 and the other half 500 at the right side of the shaft member as shown in FIG. 1. The coupling half 480 receives the opposite end of the shaft member 100 in its boss 520 meshing the external splines 180 with a mated internal splines 540 formed at the boss hole. The shaft member end is then fixed in the recess 300 by a nut 560. The last coupling half 500 receives the end of the other half of the shaft whose torque is to be measured. The two coupling halves are fastened to each other by bolts 660 which pass through holes 640,650 formed at flange portions 600,620 and is screwed down by nuts 680. The two shaft halves 360,580 of the shaft are thus coupled with shaft member 100 through the flange couplings. As a results, when the two shaft halves are twisted in opposite directions, the applied torque will be transmitted to the shaft member 100 positioned therebetween. It should be noted that the size of the flange couplings and so on must be machined precisely such that the central axis of the shaft member aligns with those of the two shaft halves when coupled together.

On the outer periphery of the central member 120 are embedded bearings 700 and outward of the bearings there is provided a housing or an enclosure member 740. The housing 740 is similar in construction as that disclosed in the first embodiment. The housing has a wing 760 which is C-shaped in cross section and is made of a rubber material. The wing 760 has a stay 780 which will be connected to a bracket 840 mounted on the vehicle body through a bolt 800 and a nut 820, as shown in FIG. 13. The reference numeral 860 indicates oil seals and the reference numeral 880 designates rings.

The housing is raised to form a bulged portion 960 having an opening 980 which is closable by a cover 1000 by screws 1060 and washers 1080 sandwiching an O-ring 1120 therebetween for tight sealing. The cover is provided with, at its inner surface, three cores made of laminated silicon steel plates. The cores have legs 1200a,1220a,1240a respectively, and the end surface of the legs are made round so as to maintain the gap or distance "d" from the magnetic amorphous film 160 at a constant magnitude, as depicted in FIG. 12. An exciting coil 1340 and two detection coils 1360 are wound around the core legs. The coils are connected to wires tied by a harness 1480 passing through a grommet 1460 rested at a window 1440 opened at a projection 1420. Since, however, these parts or portions are quite identical to those discussed in the first embodiment in structures and functions, detail explanation thereof will be omitted Nextly, mode of attaching the sensor on the shaft will be explained with reference to FIG. 13.

The shaft member 100 is inserted in the housing 740. The coupling half 240 is connected to the one end of the shaft member 100 fitting the external splines 180 to the internal splines 280. The shaft end 200 is then fastened by the nut 320. The coupling half is then fastened, by the bolts 440 and nuts 460, to the coupling half 340 which has been coupled to the one half 360 of the shaft whose torque is to be measured. Similarly, the shaft member 100 is connected to the third coupling half 480 which will in turn be fastened to the fourth coupling half 500 connected to the other shaft half 580. The cover 1000 is then attached to the housing 740. The housing 740 is finally connected to the bracket 840 through the stay 780 by the bolt 800 and the nut 820. Alternatively, after the first and the third coupling halves 240,480 have been coupled to the shaft member 100 and at the outer side thereof, the second and fourth coupling halves 340,500 may be fastened together. After completion, when a torsional force is applied to the shaft halves, the torque will be detected through the magnetic amorphous film and detection coils in the same manner as was explained in the first embodiment.

The sensor according to the second embodiment is advantageous in that, in addition to the advantages mentioned with reference to the first embodiment, it will be more simply mounted on the shaft particularly when the shaft is of long length such an example as is a vehicle drive shaft.

While in the embodiments described in the foregoing, a magnetic amorphous material is used, the invention is not limited to this and may use any material exhibiting similar magnetic characteristics.

The present invention has thus been shown and described with reference to specific embodiments. However, it should be noted that the present invention is in no way limited to the details of the described arrangements but changes and modifications may be made without departing from the scope of the appended claims.

What is claimed is:

1. A torque sensor, comprising
   a shaft whose torque is to be measured, said shaft being cut into two halves and the shaft halves being externally splined at their ends;
   a shaft member relatively shorter than the shaft halves whose torque is to be measured, the shaft member being externally splined at both ends;
   a pair of flanges each having an internally splined bore to receive the externally splined ends of the shaft halves and the shaft member such that the shaft halves are coupled to the shaft member to transmit rotation to the shaft member;

a magnetic element provided on the shaft member responsive to the rotation thereof;

an enclosure member housing the shaft member independently of its rotation; and means positioned on an inner wall of the enclosure member for detecting changes of the magnetic characteristics of the magnetic element to measure torque applied to the shaft.

2. A torque sensor according to claim 1, wherein said magnetic element is a magnetostrictive element and said detecting means comprises a core and coils wound thereon.

3. A torque sensor according to claim 2, wherein said magnetostrictive element is a magnetic amorphous film.

4. A torque sensor according to claim 2, wherein said enclosure member has an opening closable by a cover and said coils are positioned at the inner wall of the cover.

5. A torque sensor according to claim 1, wherein said internally splined flange bore receives said externally splined ends of the shaft halves and shaft member from the opposite directions such that they face each other in the bore.

6. A torque sensor according to claim 5, wherein said detecting means includes an excitation coil and two detection coils which are arranged in a triangular configuration such that flux paths coincide with the direction in which compressive and tensile stress becomes maximum when the rotation is transmitted to the shaft member.

7. A torque sensor comprising:
a shaft whose torque is to be measured, said shaft being cut into two halves;
a shaft member relatively shorter than the shaft halves whose torque is to be measured;
a pair of flanges coupling the shaft member with the shaft halves at both its ends;
a magnetic element provided on the shaft member responsive to the rotation thereof;
an enclosure member housing the shaft member independently of its rotation; and
means positioned on an inner wall of the enclosure member for detecting changes of the magnetic characteristics of the magnetic element to measure torque applied to the shaft,
wherein said magnetic element is a magnetostrictive element of magnetic amorphous film and said detecting means comprises a core and coils wound thereon,
wherein said enclosure member has an opening closeable by a cover and said coils are positioned at the inner wall of the cover, and
wherein said inner wall of the cover is made flat.

8. A torque sensor according to claim 7, wherein said core has poles on which said coils are wound respectively, said poles being different in length and each having the rounded end surface curved at the same radius of curvature as that of the enclosure member on which the magnetostrictive element is affixed.

9. A torque sensor for measuring torque applied to a rotatable shaft, comprising, a first member for attaching to the shaft to rotate with the shaft and responding to torque applied to the shaft, a magnetic element provided on an outer surface of the first member, a second member enclosing at least a portion of the first member having the magnetic element, said first member being rotatable relative to the second member, and means positioned on an inner wall of the second member for detecting changes in the magnetic characteristics of the magnetic element for measuring the torque applied to the shaft, wherein the first member is a shaft element interposed in axial alignment with and in place of a section of the rotatable shaft, and said first member has ends coupled to spaced ends of the rotatable shaft,
wherein said detecting means comprises a core and coils wound thereon, said second member having an opening closable by a cover and said coils being positioned at an inner wall of the cover, and wherein said inner wall of the cover is made flat.

* * * * *